US006173044B1

United States Patent
Hortensius et al.

(10) Patent No.: US 6,173,044 B1
(45) Date of Patent: *Jan. 9, 2001

(54) MULTIPOINT SIMULTANEOUS VOICE AND DATA SERVICES USING A MEDIA SPLITTER GATEWAY ARCHITECTURE

(75) Inventors: Peter Dirk Hortensius, Goldens Bridge, NY (US); Leon Lumelsky, Stamford, CT (US); Anand Narasimhan, Ossining, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/595,897

(22) Filed: Feb. 6, 1996

(51) Int. Cl.[7] .................................................... H04M 11/00
(52) U.S. Cl. ..................................... 379/93.09; 379/93.34; 379/93.14
(58) Field of Search ................................ 379/90, 93, 96, 379/98, 201, 202, 90.01, 93.01, 93.05, 93.09, 93.14, 93.15, 93.17, 93.28, 93.31, 93.34; 364/514 R; 370/214, 259, 270, 401, 389, 392, 352, 404, 485, 493–495, 410, 522, 527, 529; 375/222; 358/434, 435

(56) References Cited

U.S. PATENT DOCUMENTS

| | | | |
|---|---|---|---|
| 5,187,591 | * | 2/1993 | Guy et al. .............................. 358/434 |
| 5,392,449 | * | 2/1995 | Shaughnessy et al. ................... 455/8 |
| 5,428,608 | * | 6/1995 | Freeman et al. ......................... 379/93 |
| 5,517,500 | * | 5/1996 | White et al. ........................... 370/392 |
| 5,537,436 | * | 7/1996 | Bottoms et al. ....................... 375/222 |
| 5,602,846 | * | 2/1997 | Holmquist et al. ..................... 379/93 |
| 5,606,599 | * | 2/1997 | O'Mahony et al. .............. 379/93.34 |
| 5,610,910 | * | 3/1997 | Focsaneanu et al. ................. 370/401 |
| 5,625,677 | * | 4/1997 | Feiertag et al. ......................... 379/98 |
| 5,636,218 | * | 6/1997 | Ishikawa et al. ..................... 370/401 |
| 5,684,825 | * | 11/1997 | Ko ....................................... 375/222 |

OTHER PUBLICATIONS

Tewani, Requirements on PSTN's to Support Evolving Multimedia Applications, ITU Study Group 15 Contribution, May 1995.*

* cited by examiner

Primary Examiner—Curtis A. Kuntz
Assistant Examiner—George Eng
(74) Attorney, Agent, or Firm—Louis J. Percello; F. Chau & Associates, LLP

(57) ABSTRACT

A gateway enables point to multipoint connectivity from voice, data, or SVD clients over voice and data networks. The gateway connects one or more known voice networks (e.g. telephone networks) and one or more data networks (e.g. LANs, WANs, and internet) so that clients on either network may access any of the networks via various devices like analog telephones, data modems, SVD modems, or direct data network connections (e.g., ethernet, token ring). The gateway has connections to both the data network(s) as well as the voice network(s). The gateway is capable of splitting a signal with both voice and data streams and routing either and/or both of these streams over the voice network alone, the data network, or both. A process, executing on the gateway enables the gateway to establish connections on gateway paths and to control and direct a flow of voice and data information between the destinations on these networks.

3 Claims, 11 Drawing Sheets

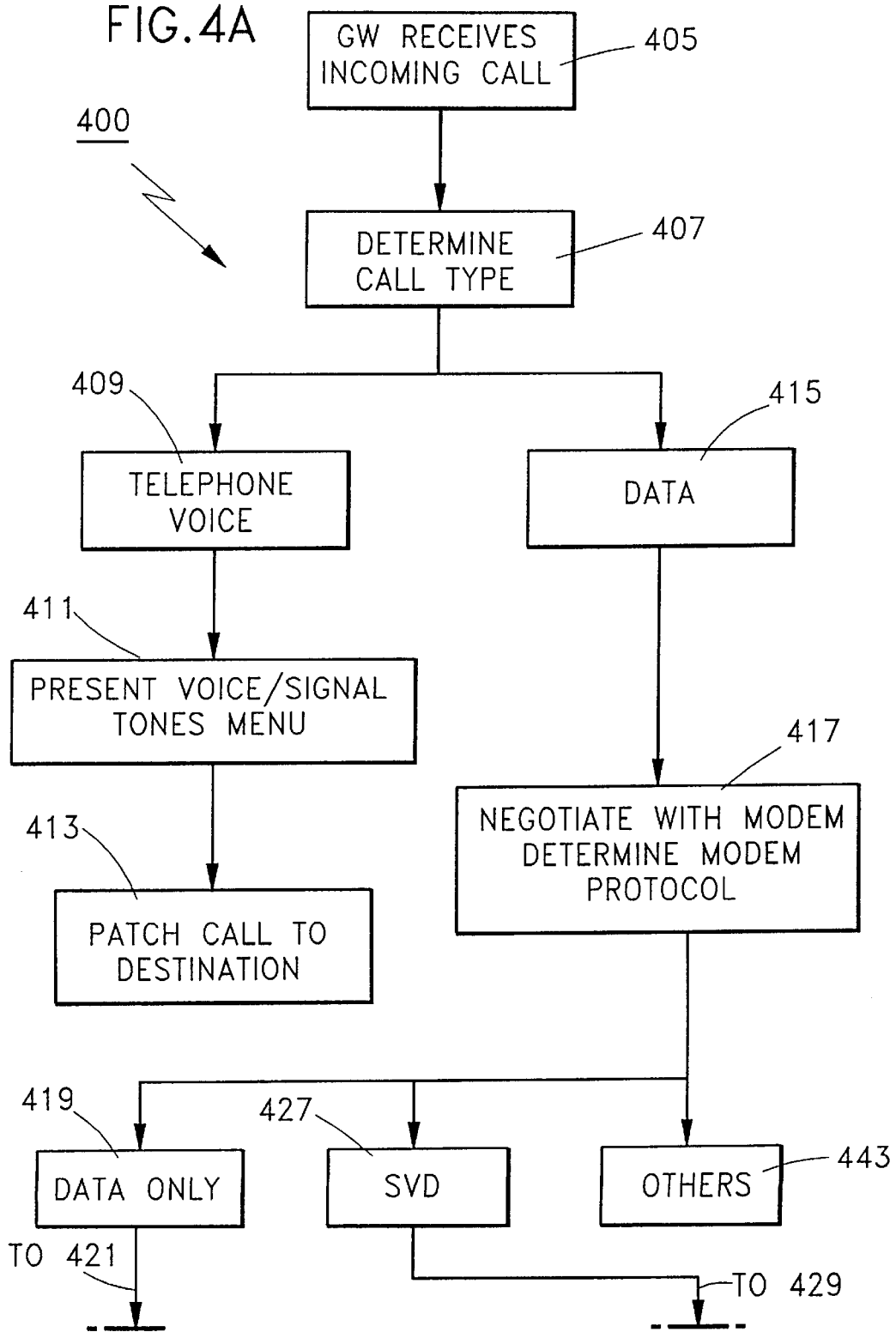

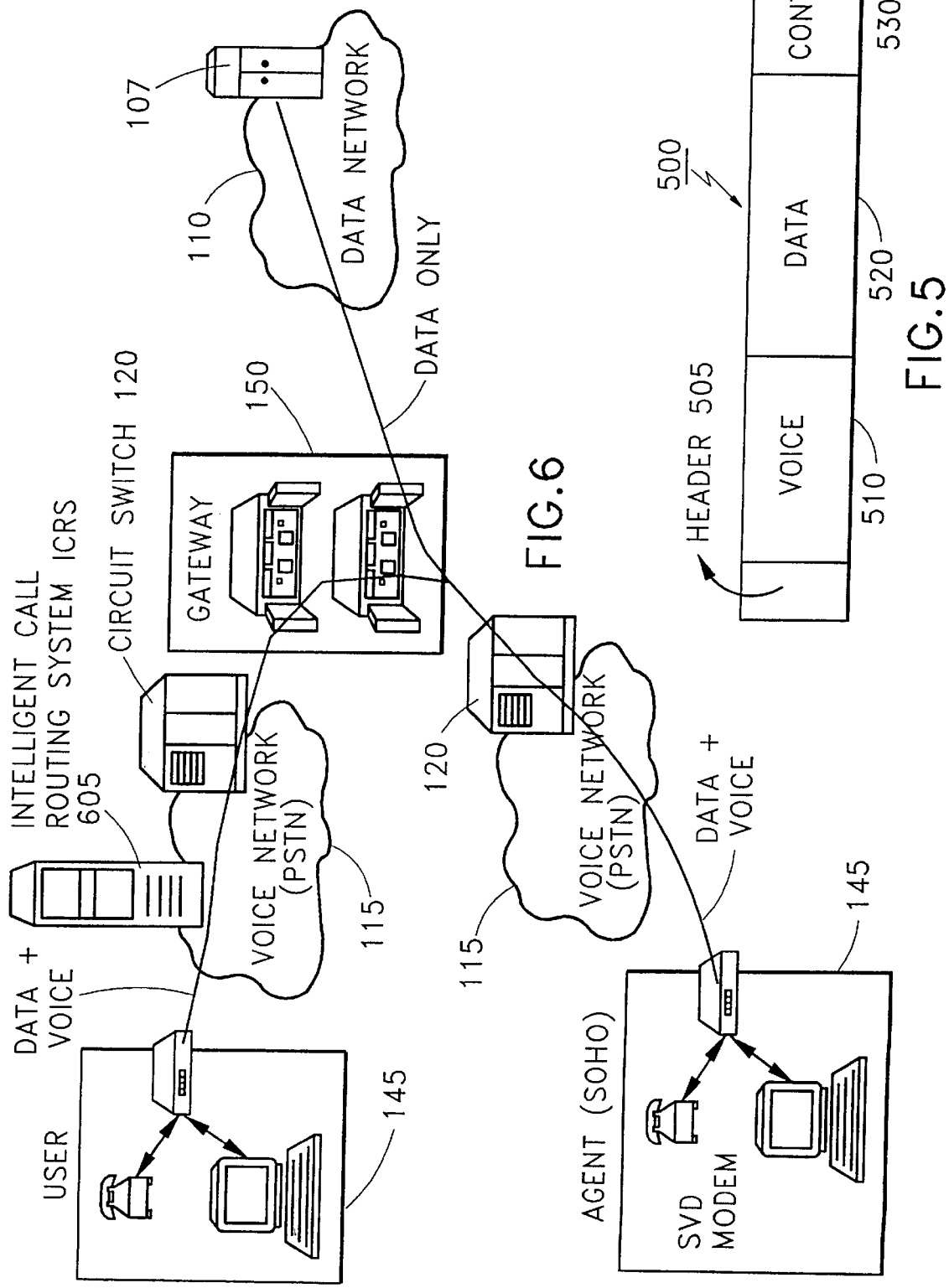

MULTIPOINT SIMULTANEOUS VOICE AND DATA SERVICES USING A MEDIA SPLITTER GATEWAY ARCHITECTURE

FIELD OF THE INVENTION

This invention relates to the field of communications over voice and data network simultaneously. More specifically, the invention relates to communicating simultaneously over a computer network like the Internet and a voice network like Public Switched Telephone Network (PSTN) using a media splitter gateway architecture (hereafter gateway.)

1. Background of the Invention

The invention relates to the simultaneous transmission of voice and data via telephone networks, and data networks, wherein the user of such a service accesses the voice and data via a single line, such as an analog telephone line. At present, two computers equipped with Simultaneous Voice and Data (SVD) modems, can talk to one another using Simultaneous Voice and Data (SVD) modems with both voice and/or data modes. However, this facility is only point-to-point by which is meant that the voice and data connections exist only between the two said computers, connected via telephone lines.

There are different types of SVD modems available for use in this manner. These differences cause capability problems between SVD modems of different types.

Hence, a limitation of the prior art is that both SVD modems must have the same SVD equipment and protocols. The session can only be between two users (i.e., point-to-point).

Other voice and data services exist, such as Integrated Services Data Network (ISDN). This is an all digital link between two or more users through a central office switching location. This provides for both data and/or voice on separate logical (not physical) channels. Here, there is still only one user (originator, i.e., sender) however, the data and voice can be split to go to different locations (destinations, i.e., receiver.) This communication type is called point to multipoint.

ISDN has complicated protocols, and the central office switches requires a unique infrastructure that supports ISDN and is not widely prevalent today. Accordingly, large scale global communications can not occur without significant and expensive modifications to the infrastructure.

Another class of voice and data services is known as Voice View (a trademark of the Radish Communications Corporation.) This system also provides point to point communication but does does not support simultaneous voice and data transmission. Here simultaneous means that the data and voice sessions exist simultaneously, i.e., with this system any user can transmit voice or data but not both. They have to transmit voice and data alternately.

2. Statement of Problems with the Prior Art

The prior art is only point to point with the exception of ISDN which point to multipoint. If a line is used in the prior art incoming calls cannot be received and no other outgoing calls can be made while the session is active, i.e., the connection is tied up. While using the data network (Internet) no phone service is available on the line and using phone service prohibits data network sessions on the phone line.

Some prior art does not allow simultaneous voice and data communication on a single phone line.

While some prior art does provide simultaneous voice and data communication, it requires high or prohibitive infrastructure cost.

The prior art is incapable of translating between different media types on different networks and protocols used on different networks. Here a media type includes voice, compressed voice, and data. Examples of protocols include D.SVD standards for simultaneous voice and data communication on telephone lines and ad hoc protocols such as are used in Voice View.

OBJECTS OF THE INVENTION

An object of this invention is a communication architecture that provides simultaneous voice and data point to multipoint communication over one phone line using currently widely deployed infrastructure in a cost effective way.

An object of this invention is a communication gateway architecture that makes different voice, compress voice, and data media types and protocols compatible.

Another object of this invention is a communication gateway architecture that enables collaborative computing, help desk, automatic call distribution and mobile or home based applications.

SUMMARY OF THE INVENTION

The invention comprises a novel gateway, that permits point to multipoint connectivity from voice, data, or SVD clients over voice and data networks. The gateway connects one or more known voice networks (e.g. telephone networks) and one or more data networks (e.g. LANs, WANs, and internet) so that clients on either network may access any of the networks via various devices like analog telephones, data modems, SVD modems, or direct data network connections (e.g., ethernet, token ring). The gateway has connections to both the data network(s) as well as the voice network(s). The gateway is capable of splitting a signal with both voice and data streams and routing either and/or both of these streams over the voice network alone, the data network alone, or any combination of voice and data networks.

Novel processes executing by the gateway permit the gateway to be connected to both the data network(s) and voice network(s) using standard hardware so that an end user on either the data or voice network or both have the ability to control the switching and routing of voice and/or data on either the data or voice network or both. Consequently a user can control transmissions simultaneously to multiple users at multiple destination each of which can have different types of (an possibly incompatible) voice data equipment.

BRIEF DESCRIPTION OF THE DRAWINGS

The foregoing and other objects, aspects and advantages will be better understood from the following detailed description of preferred embodiments of the invention with reference to the drawings that are include the following:

FIG. 3, comprising

FIG. 4, comprising FIGS. 4A and 4B shows the flowchart of the process of call establishment, for point to multipoint connections from a SVD modem equipped user to different destinations on the voice and the data network.

FIG. 5 shows a block diagram of a logical schematic of the voice, data and control information data structure (packet) as it is carried on the SVD modem.

FIG. 6 shows an example of a user (SVD modem equipped), accessing a service agent in a Small Office Home Office (SOHO) environment, and also an SVD modem equipped user.

DETAILED DESCRIPTION OF INVENTION

The invention comprises a Gateway, that permits point to multipoint connectivity from voice, data, or SVD clients over voice and data networks. The operation of the invention may be described with reference to FIG. 1.

Here, a voice network 115 and a data network 110 are shown, logically distinct from one another. Clients on either network may access the network via analog telephones 135, modems 144 (like data modems and SVD modems) or direct data network connections (e.g., ethernet, token ring) 121.

Figure 1:
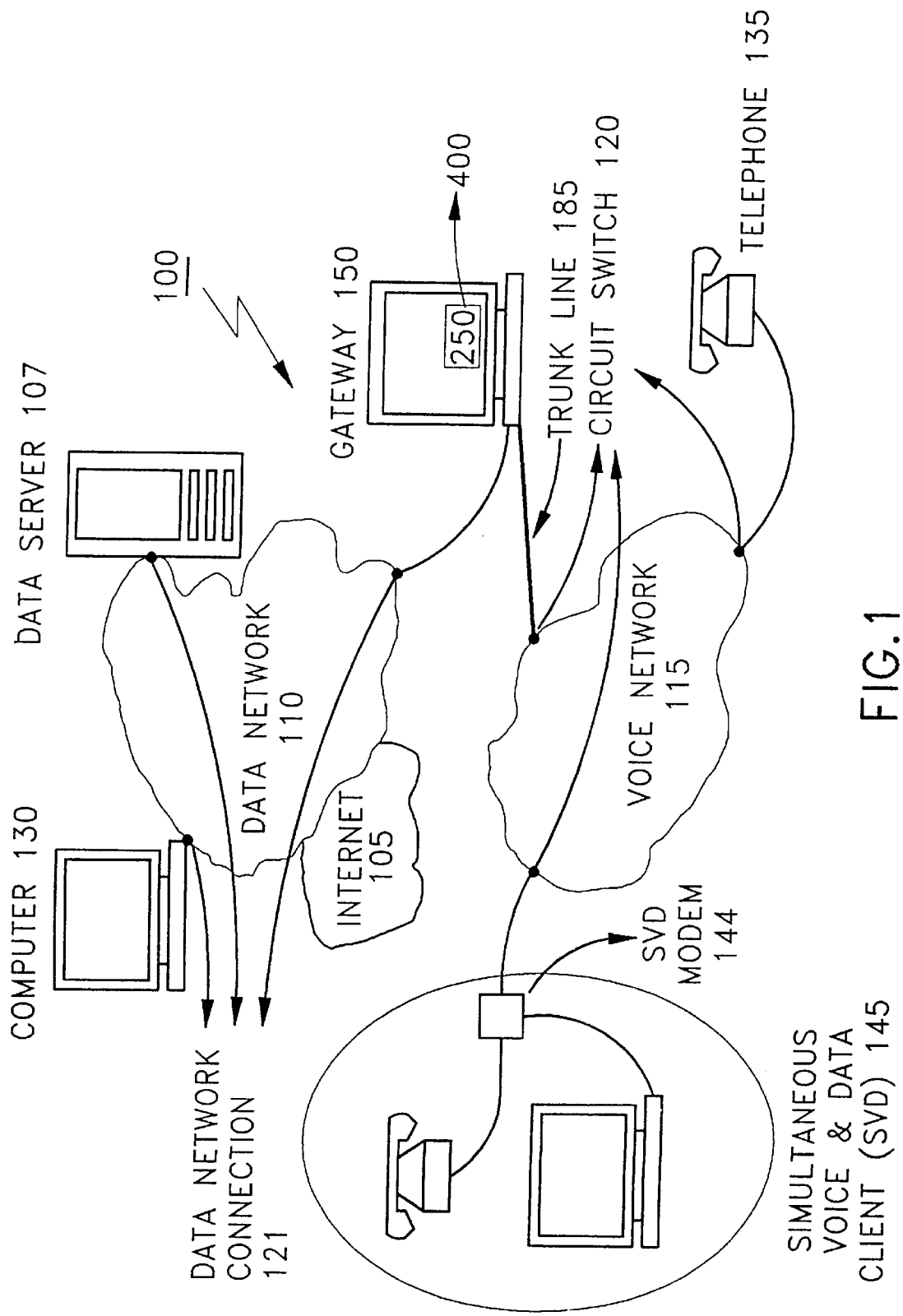
FIG. 1 is a block diagram showing voice and data networks connected to the present gateway.

As shown in FIG. 1, a SVD modem 144 equipped client 145 is connected to the voice network. One or more analog telephones 135, also are connected to the voice network 115. One or more computers 130 are connected to the data network 110. Typically, one or more data servers 107 are also connected on the data network 110.

The system 100 represents an entire voice and data network, with all the connections to clients 145, servers 107, gateways 150 and enabling hardware and software on the voice and data network system 100. The data network 110, is typically a local area network (LAN) or a wide area network (WAN), with possible connections to other networks such as the Internet, represented by 105. Data networks 105 like this are well known. A typical server 107 on the data network 105 accesses data from (and sends data through) the data network 105. The voice network 115, typically is the public switched telephone network (PSTN), with switches 120, which serve the purpose of switching calls on the voice network, between clients 145. Computers 130 can be connected to the voice network, via data modems as can standard telephone sets (telephones 135). A typical modem used to connect both computers 130 and telephones 135 is a simultaneous voice and data modem (SVD) 144, which permits the flow of data and voice simultaneously on the voice network. These technologies are well known.

The novel Gateway 150 is capable of splitting a signal with both voice and data components (streams) and routing either and/or both of these components (streams) over the voice network alone, the data network alone, or any combination of voice and data networks. The Gateway 150, has connections to both the data network(s) 110 as well as the voice network(s) 115. In a preferred embodiment, the connection to the voice network(s) 115 is via a dedicated trunk line (T1) 185 to switch 120, and the connection to the data network(s) 110 is via data network connection 121, e.g. a token ring.

Novel processes 400 permit the gateway to be connected to both the data network(s) and voice network(s) using standard hardware so that an end user on either the data or voice network or both has the ability to control the switching and routing of voice and/or data on either the data or voice network or both. Consequently a user can control transmissions simultaneously to multiple users at multiple destination each of which can have different types of (an possibly incompatible) voice data equipment.

Figure 2:
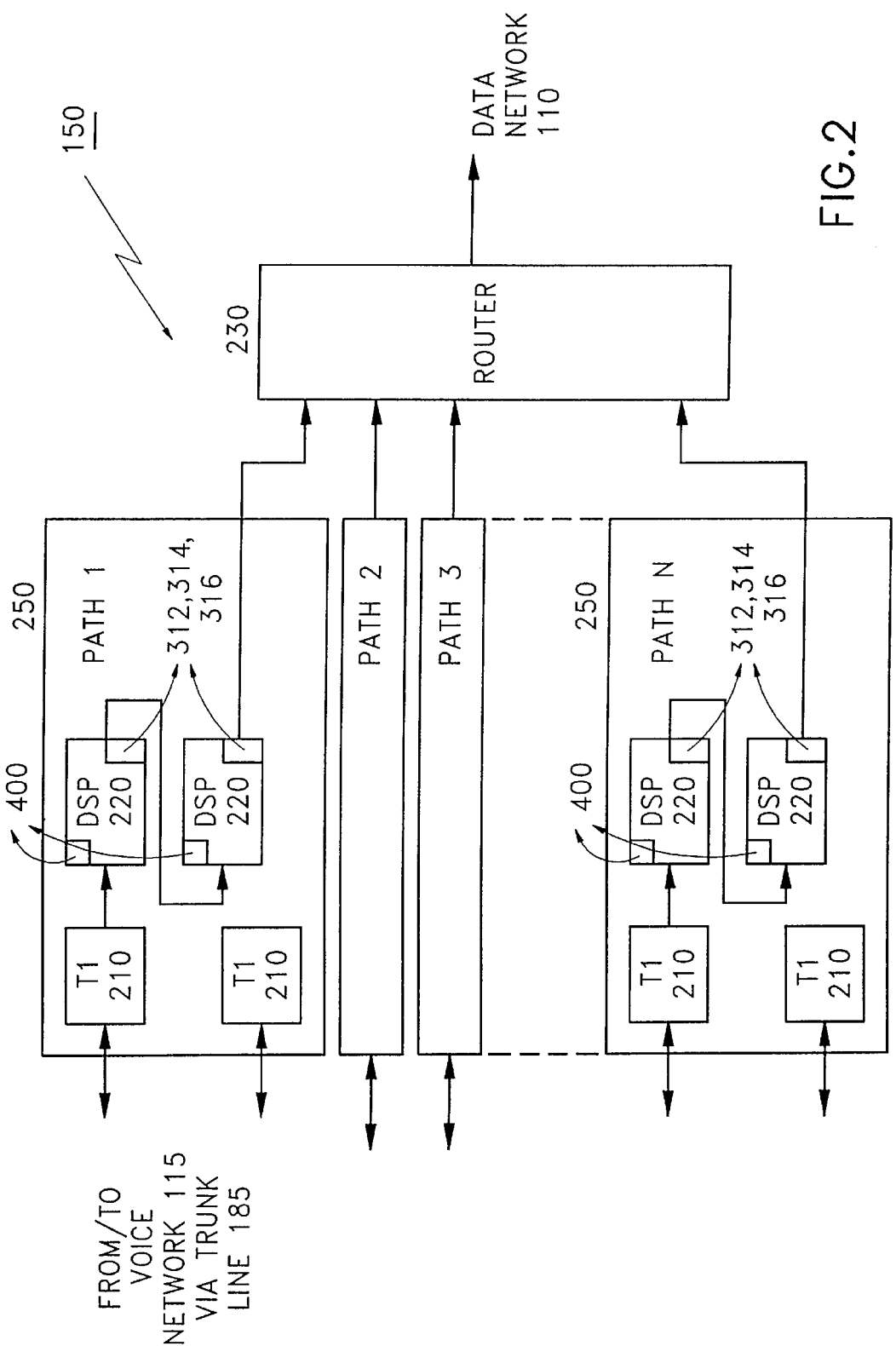
FIG. 2 is a block diagram showing the components and connections of the gateway.

The architecture of the gateway is shown in FIG. 2. The gateway 150 comprises a computer with connections 210 to the voice network(s), one or more routers 230, connected to the data network(s) 110, and one or more paths 250. The computer can be any general purpose computer, e.g., an IBM PC.

The Gateway is shown here as comprising a number of paths 250, corresponding to each of one or more channels 210 on the T1 trunk line 185. For each of these T1 channels 210, there is a bank of DSP resources 220 available for performing a number of signal processing algorithms. Examples of these processing algorithms include modem protocols, voice compression/decompression, etc. The DSP's are dynamically allocatable for one or more signal processing algorithms on each channel 210. An example of this component would be an IBM MWAVE DSP chip. Also shown in FIG. 2 is a data connection from each path 250, to one or more routers 230, through which each path 250 has access to the data network(s) 110.

Further note that these channels 210 can be physical or logical and are typical full duplex links to telephone switches 120 that have multiple logical ports for sending and receiving multiple data streams. These channels 210 are well known.

Also resident on one or more of the DSP's are novel processes 400 that enable a point to multipoint connection for simultaneous voice and data signals.

The operation of the gateway in permitting simultaneous voice and data access for point to multipoint operation is described by the non limiting examples explained in FIG. 3A–3D.

Figure 3A:
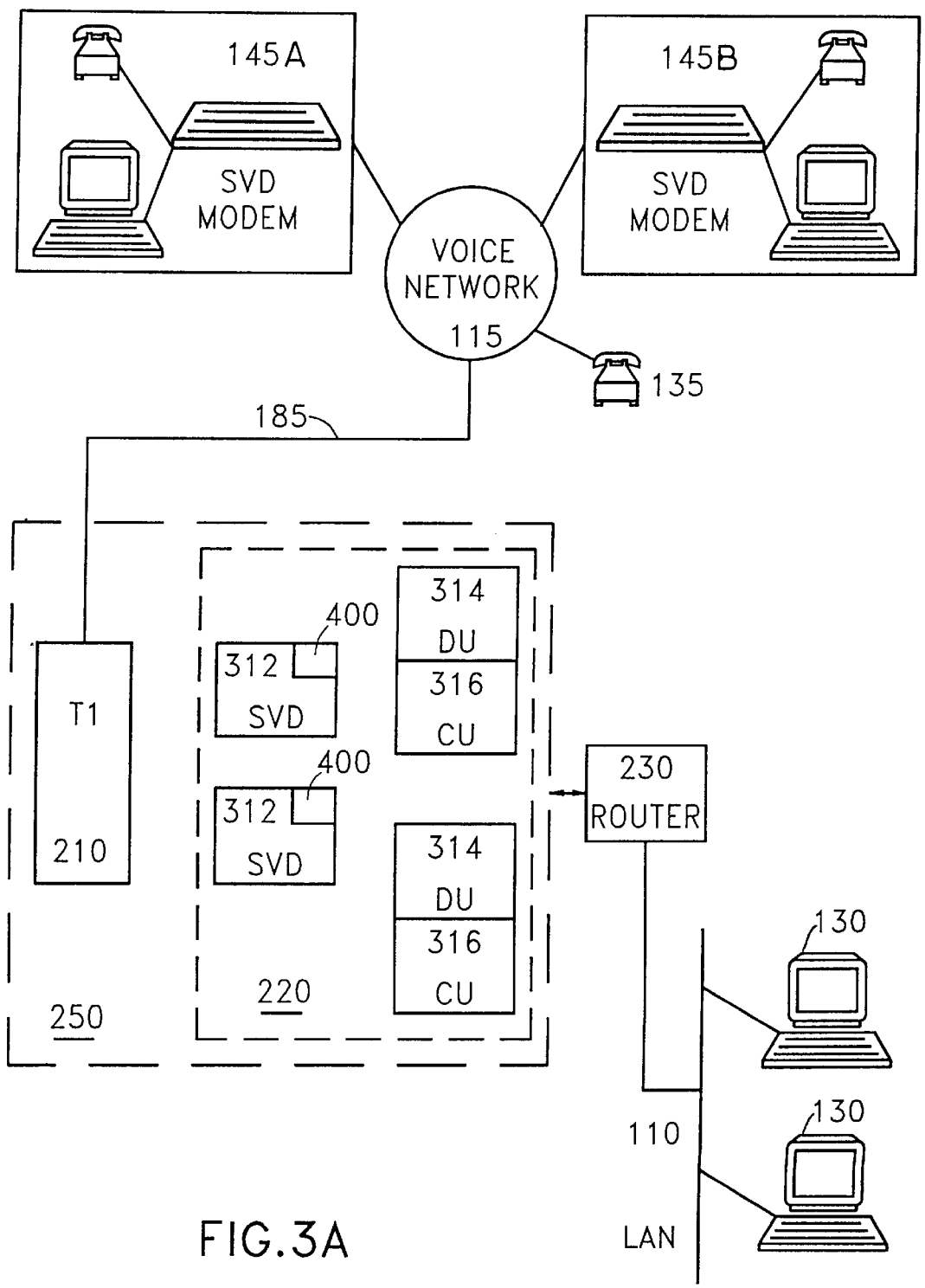
FIGS. 3A–3D, are block diagrams showing various connections and data flows that are handled by the gateway.

In FIG. 3A, the DSP 220 is shown in further detail. The DSP comprises one or more simultaneous voice and data modem process (SVD) 312, one or more voice decompression processes (DU) 314, and one or more voice compression processes (CU) 316. The CU and DU are known processes for compressing/decompressing voice/data, e.g. G.723. The SVD 312 contains novel processes 400 that are described below.

Figure 3B:
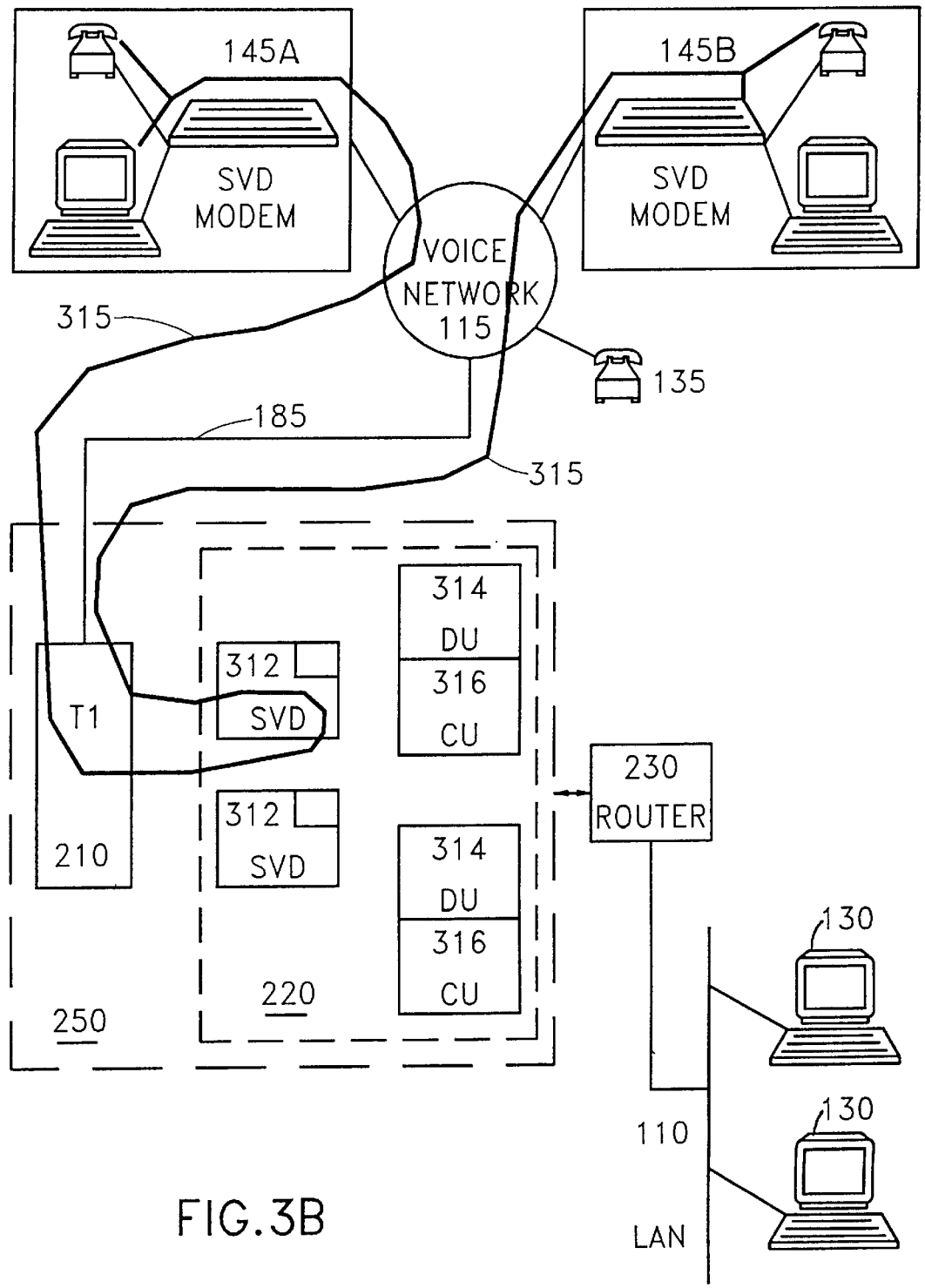

FIG. 3B shows the connection between two SVD modem 144 equipped clients 145, through the gateway 150. As shown by connection (or stream) 315, a telephone call is placed through the voice network 115. From here, the call is sent to the gateway 150 via a digital trunk channel 185, to channel 210 on the gateway 150. (The gateway 150 is selected, by the user or by the switch by a unique number, e.g., a destination phone number.) Then, the data on the trunk 185 (e.g. digital data) is sent to SVD 312 which establishes a SVD connection with the sender client's 145A SVD modem. A control message 500 is passed between the client 145A and the gateway 150, to determine the routing information for the voice and data channels that exist simultaneously on the SVD call. (See below for a further description of the control message 500.)

If the calling client 145A wishes to place an SVD call to another SVD modem equipped client 145A, the call is routed as shown in FIG. 3B, via another channel 210, through the voice network 115, and eventually to the destination client with the SVD equipped modem. (Note that the two clients 145A shown in FIG. 3B alternatively can be calling 145A or destination 145B clients.)

Figure 3C:
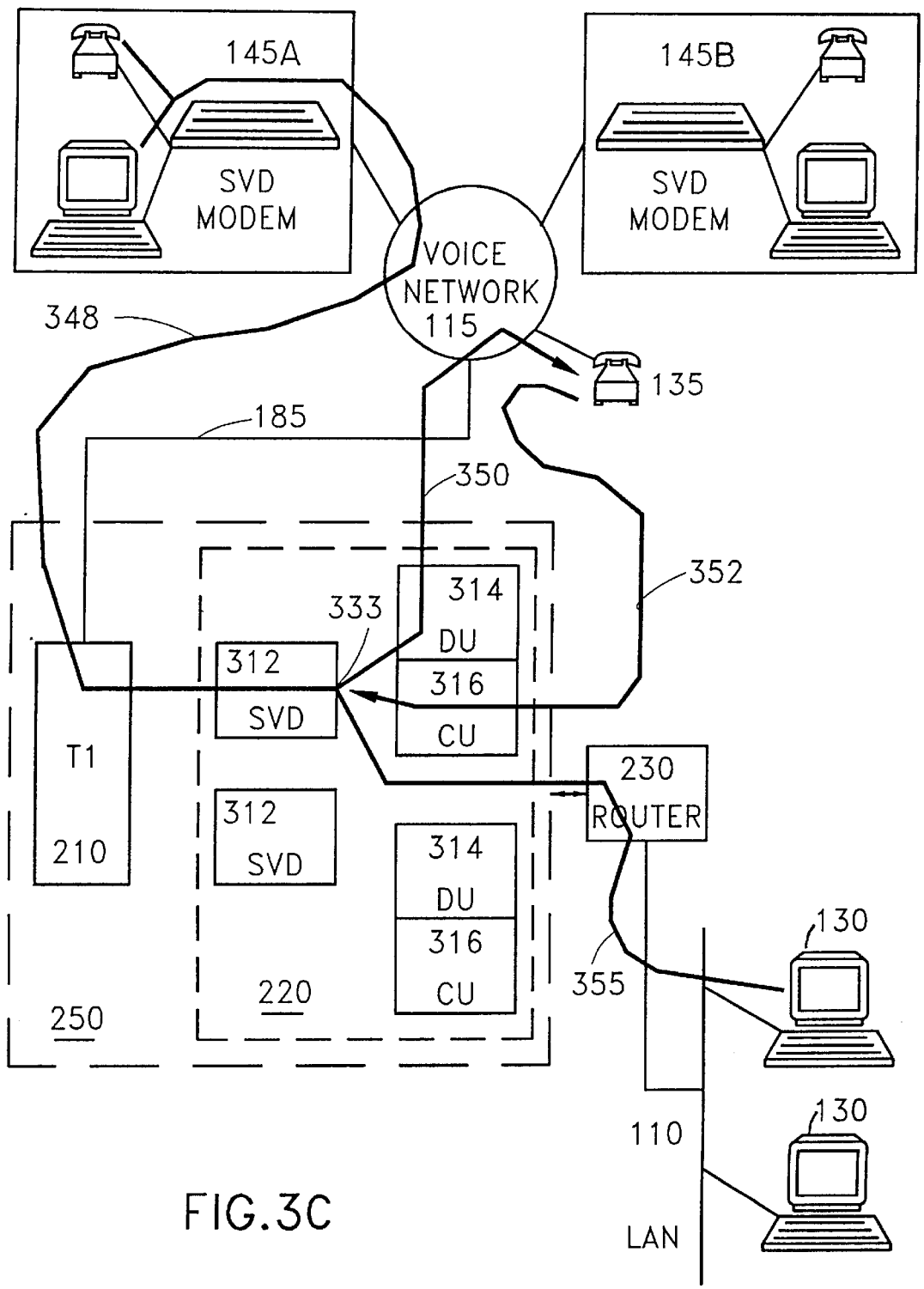

FIG. 3C shows yet another scenario. If the calling SVD client 145 wishes to place a voice call 350 to telephone unit 135 (note that there is no computer to process data here), and a data call to a destination on the data network 110, the voice channel of the SVD call is split 333 from the combined voice and data stream by SVD 312, and is passed to DU 314 for decompression. Subsequently, the voice stream part 350 of the voice and data stream 350 is routed via another channel 210, through the voice network 115, to the telephone 135. In a similar fashion, voice 352 from telephone 135 is routed through the CU 316, and is then passed through the SVD modem 312, through the T1 channel 210, and through the voice network 115 to the SVD client 145B.

The data stream 355 intended for the data network 110 is split 333 by the SVD 312 from the combined voice and data stream 348, and routed through router 230, to the data network 110.

Figure 3D:
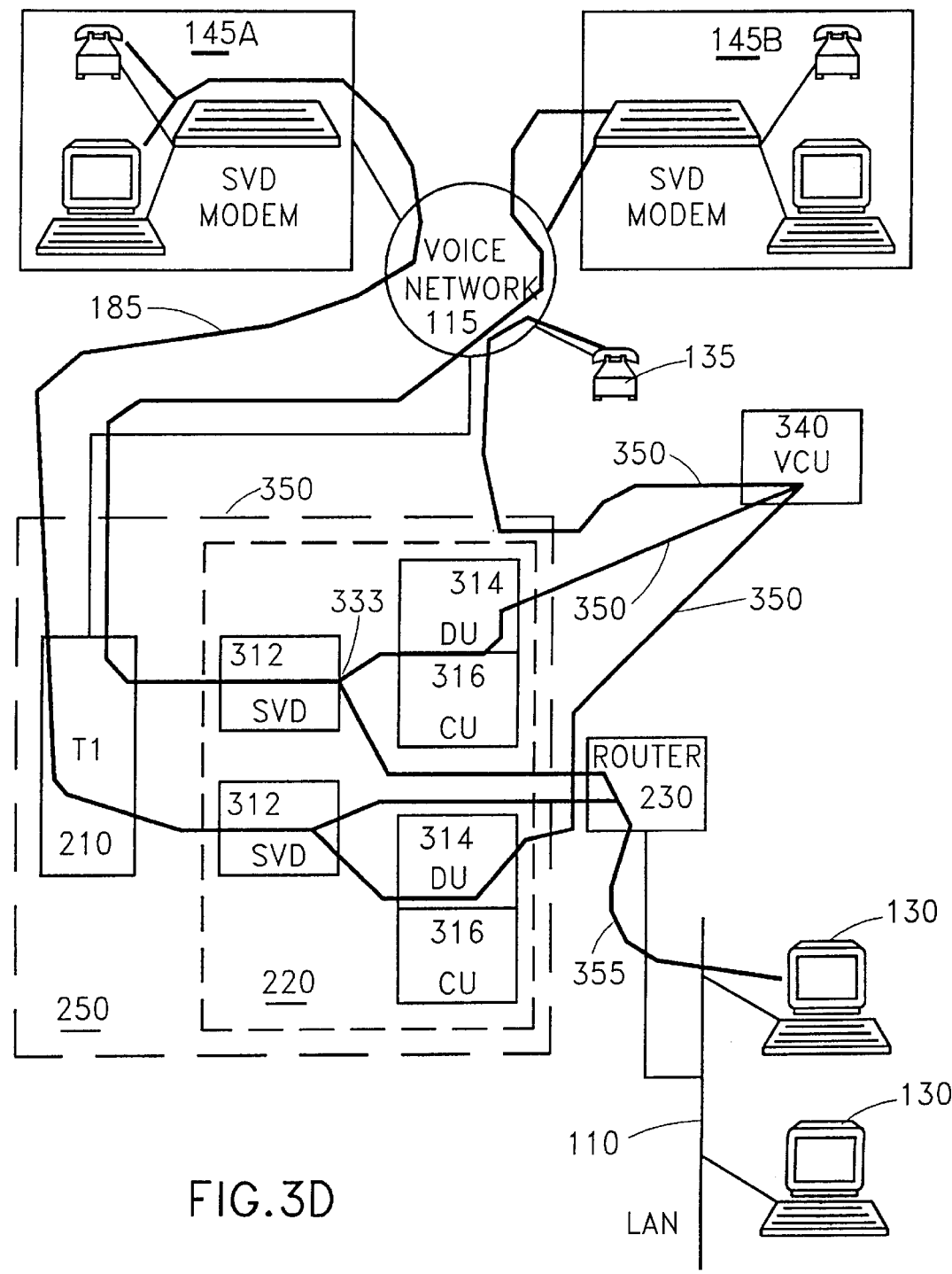

FIG. 3D shows yet another scenario, as an extension of the scenario in FIG. 3C and FIG. 3B. Here, two SVD modem equipped users 145 (145A and 145B) are shown with a telephone user 135, i.e., another point to multipoint embodiment. The users 145 have data sessions 355 on the data network 110. At the same time, users 145 and user 135 also have all their voice channels conferenced through a voice conferencing unit (VCU) 340. Since the voice from users 145 is compressed for transmission over the voice network 115, it is first decompressed through DU 314, and then sent to the VCU 340. Similarly, since voice from telephone 135 is not compressed, it is sent directly to the VCU 340. This distinction is made by the SVD 312 as described below. Note that all users get combined voice data from all the other users sending voice data in the session. This happens because all the voice components of the session are sent to the VCU 340 the voice components of the session are combined at the VCU 340. VCUs 340 are well known in the telecommunications arts.

After all the voice streams 350 are combined in the VCU 340, the combined voice stream 350 is directly sent to telephone(s) 135 via trunk channel 210 and voice network 115. In addition the combined voice stream 350 is compressed at the CU 316, and sent to the SVD users 145B. In this way, voice conferencing is possible between SVD users 145 and normal telephone users, while the SVD users 145 are simultaneously engaged in data sessions on the data network 110.

Figure 4B:
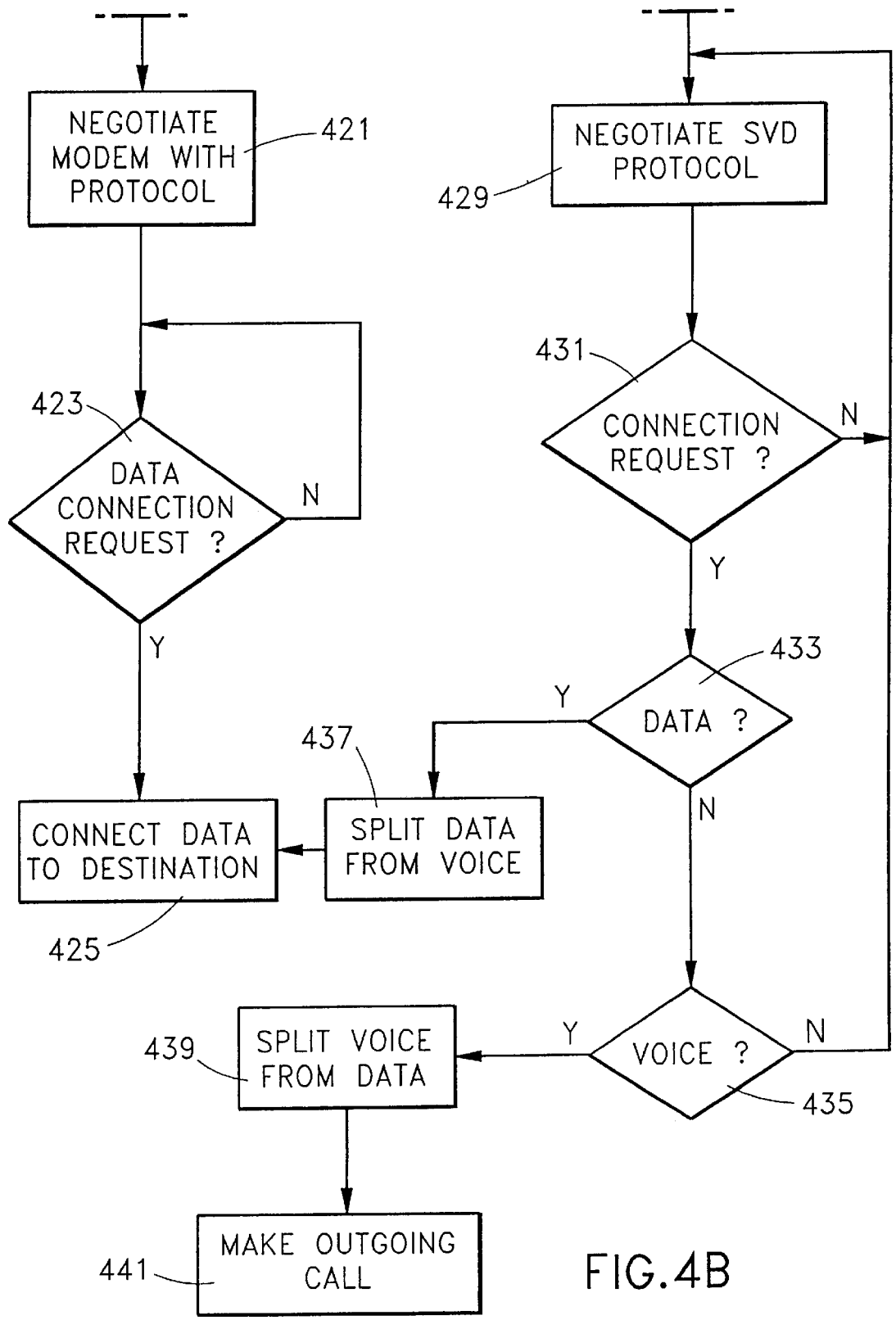

FIG. 4 is a flow chart showing the steps of the novel process 400 in VD 312.

Here, the Gateway (GW) 150 receives an incoming call in step 405. Step 407 then determines whether the call is a voice telephone call or a modem data call. This is done by examining known signal identifiers on the incoming call, e.g., the tone that indicates a data facsimile is being sent.

If the call is a telephone voice call 409, the Gateway 150 presents a menu via voice or signal tone prompts, requesting the initiating caller to enter a destination phone number or address 411. When the initiating caller enters the destination number, the Gateway 150 places an outgoing call to the destination number, and makes the connection to the initiating caller 413. Thus the voice call is established. If the call type in 407 is determined to be data (modem), in 415, the data connection is routed to a modem protocol 417, and the modem protocol type is determined.

If the modem is a regular data only modem 419, the modem protocol is used in step 421 to negotiate with initiating caller, and if a data connection is requested 423, the initiating caller is connected to a data destination 425.

If the modem protocol is determined to be SVD 427, SVD protocol is used 429 to negotiate with the initiating caller. If a connection is requested 431 from the initiating caller to the gateway 150 via the control field (530 below), it is determined whether the connection is data 433 or voice 435. If the request is for data, the data is split from the combined SVD voice and data stream 437, and connected to the final data destination. If the request is for voice, voice is split from the combined SVD voice and data stream 439 and an outgoing call is placed 441 the voice destination, and the initiating caller is connected to the voice destination.

The data 437 and voice 439 splitting are accomplished by examination of a data packet 500 (described below). In the packet, voice stream 510, data streams 520, and control streams 530, occupy specific locations on the novel packet 500 as designated by header 505 information. Accordingly, the process 400 uses the location of the voice 510 and data 520 information to remove each of these streams (510, 520) and route separately to their respective destinations as specified in in the control stream 530. (Note that more than one 535 data stream 520 and/or voice stream 510 can be located on the data packet 500.) The packet 500, with its fields (505, 510, 520, and 530) can be created by the gateway 150 or any SVD user/client 145. On the gateway 150, packets are created by processes running on one or more signal processing resources 220. In this process, digital data from the data network 110 is stored in a buffer, to create the data 520 of the packet 500. Voice data from the voice network 115 is received in digital format from unit 210, and also stored in a buffer to create the voice 510 of the packet 500. Control information 530 is then added to the packet. This control information is produced by processes running on one or more signal processing resources, and the computer of the gateway 150, as a result of control information received from one or more clients/users, and as a result of control information from process 400.

If the modem is determined to be a different modem type than described above 443, other modem protocols may be employed to establish the appropriate protocol. Such protocol extensions are made possible by incorporating them into one or more DSP resources 220, as appropriate.

FIG. 5 is a block diagram of a data packet 500 comprising the logical units of the multiplexing of voice 510, data 520 and control 530 information on a single connection. Every SVD data stream is logically broken up into separate data and voice streams, and in addition, there is a control stream, for passing information between SVD modems, to control the flow and routing of the constituent voice and data streams. For example, sender and destination telephone numbers are sent via this control channel 530. Other information for call control, such as call hold, transfer, etc. are also sent via this control channel 530.

As data and voice networks grow, the capacity of a gateway 150 may require an increase. For this purpose, gateways 150 have the capability to be interconnected, or placed in multiple locations, on voice and data networks.

The gateway 150 can be used in a number of applications, made uniquely possible by the gateway's 150 ability to provide point-to- multipoint connectivity.

FIG. 6 shows an example of a user 145 (SVD modem equipped), accessing a service agent in a Small Office Home Office (SOHO) environment, and also an SVD modem equipped user 145. Here, the agent uses one telephone line connected to the voice network 115, to simultaneously talk to the calling User 145, and to access data on a data network 110.

FIG. 6 describes an example where user 145 (SVD modem equipped) makes a voice call to Agent 145 (also SVD modem equipped). At the same time, both User and Agent also have data sessions on the data network 110. This scenario is useful in situations where the Agent is for example a Small Office Home Office (SOHO) agent, who benefits from the use of a single phone line, for both voice and data connections simultaneously. Both users now do not tie up their lines, and are free to carry on data sessions while talking to each other.

Figure 7:
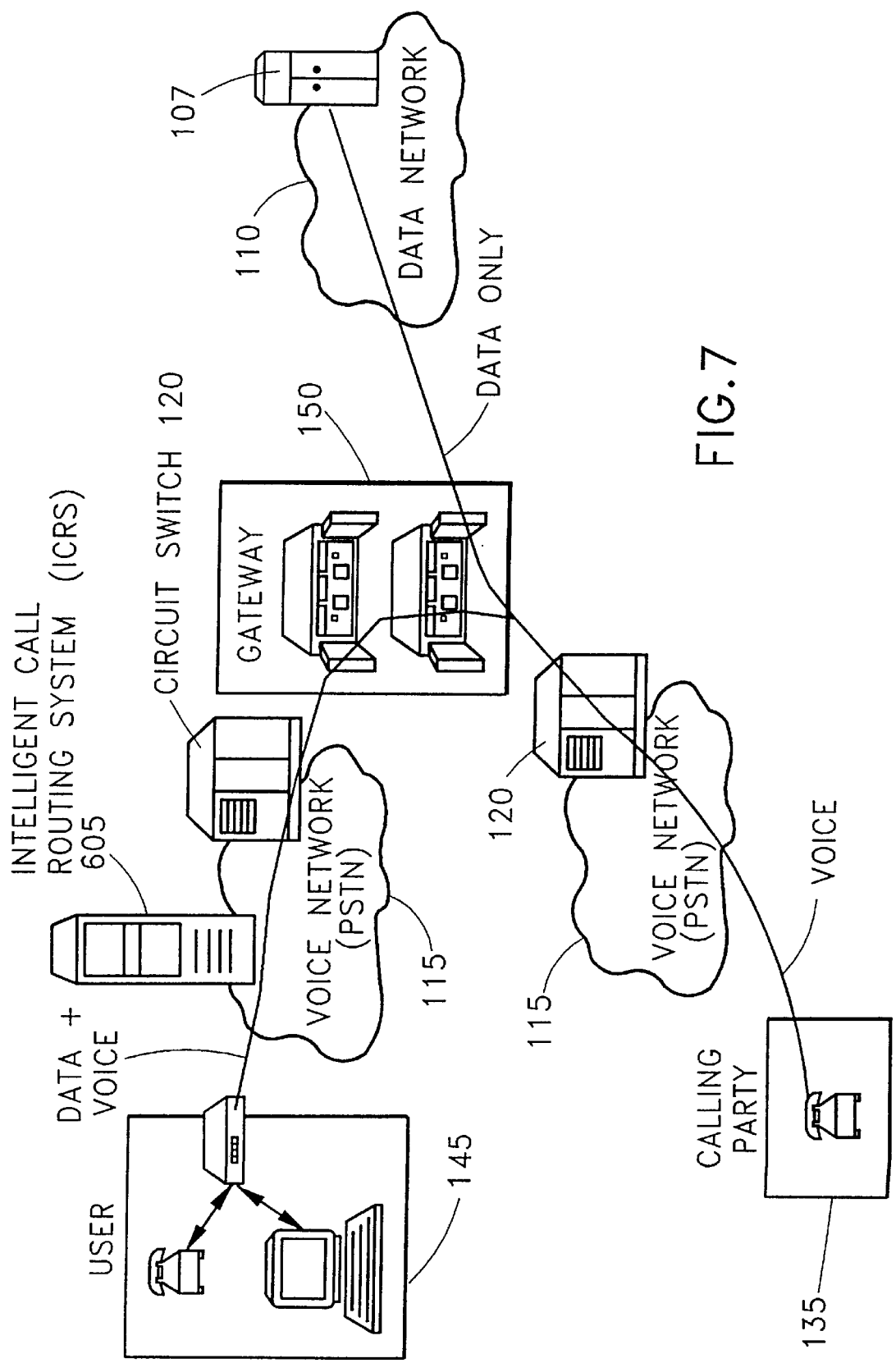
FIG. 7 shows an example of a User with a data session on a data network, via an SVD call placed through voice network, and through the Gateway, while receiving an incoming voice call.

In FIG. 7, User 145 has a data session on a data network 110, via an SVD call placed through voice network 115, and through the Gateway 150. Now, telephone user 135 wishes to place a voice call to User 145. The call comes in to the Gateway 150. The Gateway 150 determines that User 145 has an incoming voice call, and alerts the User 145 of the incoming call. Now, if User 145 wishes to accept the incoming voice call, the Gateway 150 connects telephone 135 to the voice channel of User 145, thereby making an incoming voice call conection. Alternately, if User 145 declines to receive the incoming voice call, the Gateway can disconnect the incoming call, or redirect the incoming call, or record a message from user 135, for User 145.

In this manner, user 145 has the ability to receive an incoming call while engaged in a data session on the data network 110.

Figure 8:
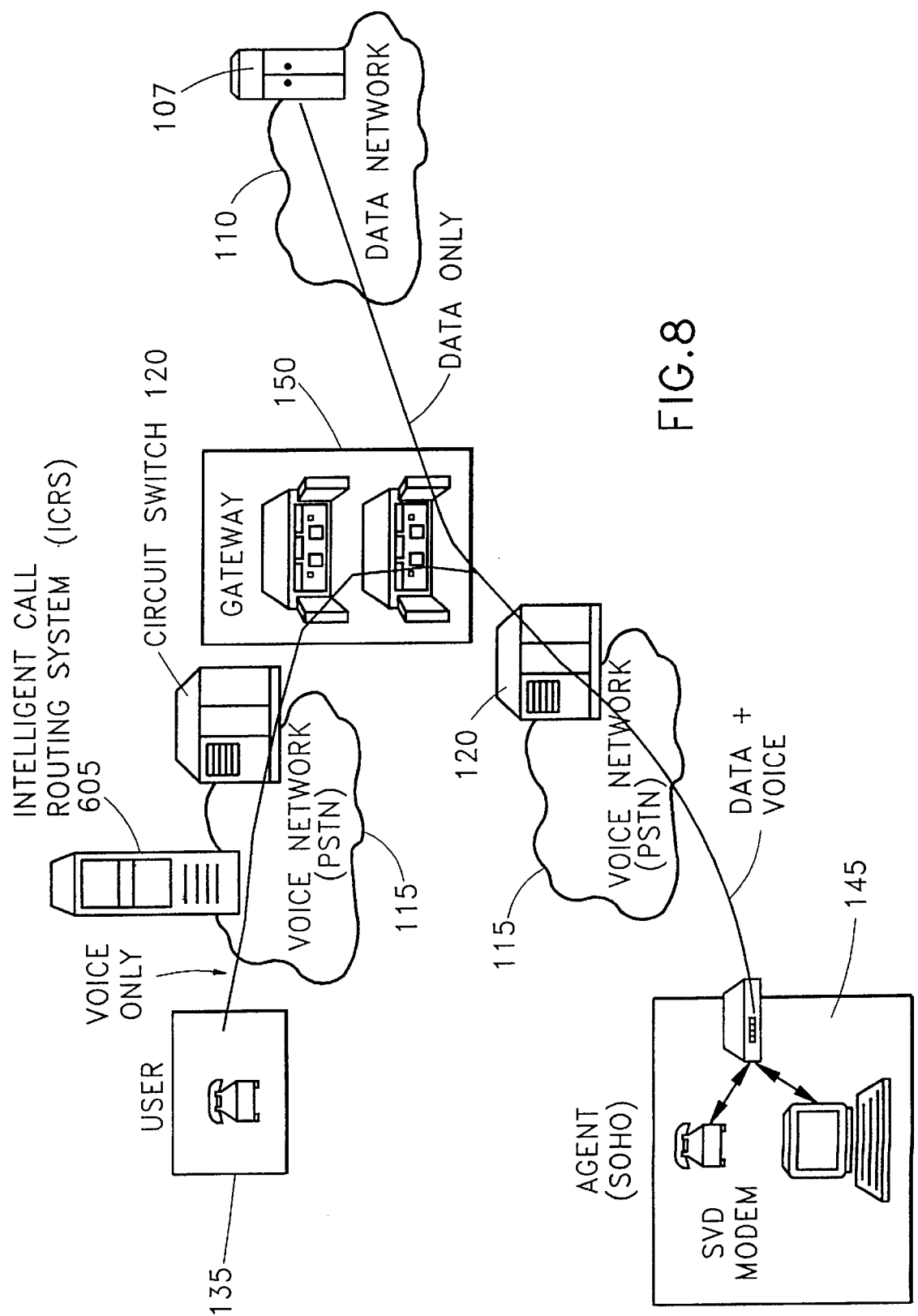
FIG. 8 shows an example where User, a telephone, calls a SOHO Agent (SVD modem equipped).

FIG. 8 shows an example where User 135, a telephone, calls a SOHO Agent 145 (SVD modem equipped). Here, unlike the scenario of FIG. 6, the user 135 does not have direct access to the data network 110. Instead, data is accessible only to SOHO Agent 145. This scenario is useful when information is to be accessed only by the agent, pertaining to the voice conversation with user 135.

At the same time, Agent 145 has access to a data session on the data network 1 10. This scenario is useful for help desk application, or for mail order applications, where agents need access to data from a data network, pertaining to clients who call them on voice only devices, such as telephones 135.

In such applications, it is useful to have a device 605, called an Intelligent Call Routing System (ICRS) which allows users (such as 135 or 145) to call one telephone number, while the ICRS determines one or more available agents, and then connects the users to the agents. The ability of the ICRS to intelligently route calls to available agents or to agents with the access to information pertinent to the calling user, is made more powerful when used in conjunction with the point-to-multipoint connection capability provided by Gateway 150.

Given this disclosure alternative equivalent embodiments will become apparent to those skilled in the art. These embodiments are also within the contemplation of the inventors.

We claim:

1. A method, executing on a computer and a SVD modem used as a gateway the method comprising the steps of:
   receiving incoming data packet over a single connection, the data packet including a message and control information capable of originating from at least one type of user on at least one voice network and at least one data network, the message being a voice type and a data type, the data type capable of having at least one data stream and at least one voice stream;
   determining the type of message;
   on determining that the message is the voice type, making a connection between the source of the message and at least one destination depending on the control information; and
   on determining that the message is the data type:
      negotiating with a modem to determine a protocol for the message;
      on determining that the protocol of the message is data only, making a data connection between the source of the message and at least one destination depending on the control information and the determined protocol; and
   on determining that the protocol of the message is an SVD protocol;
      splitting the data stream from the message, if present;
      splitting the voice stream from the message, if present;
      connecting the data stream to at least one data destination designated in the message; and
      connecting the voice stream through an outgoing call to at least one voice destination designated in the message where a first destination is a telephone capable of communicating only voice and a second destination is simultaneous voice and data (SVD) modem, where the control information causes the gateway to compress a voice signal from the telephone to the SVD modem and decompress the voice signal from the SVD modem to the telephone.

2. A program storage device readable by a computer, having a program of instructions executable by the computer to perform method steps for using the computer as a gateway, the method comprising the steps of:
   receiving incoming data packet over a single connection, the data packet including a message and control information originating from at least one type of user on at least one voice network and at least one data network, the message being a voice type and a data type, the data type having at least one data stream and at least one voice stream;
   determining the type of message;
   on determining that the message is the voice type, making a connection between the source of the message and at least one destination depending on the control information; and
   on determining that the message is the data type:
      negotiating with a modem to determine a protocol for the message;
      on determining that the protocol of the message is data only, making a data connection between the source of the message and at least one destination depending on the control information and the determined protocol; and
      on determining that the protocol of the message is an SVD protocol;
         splitting the data stream from the message, if present;
         splitting the voice stream from the message, if present;
         connecting the data stream to at least one data destination designated in the message; and
         connecting the voice stream through an outgoing call to at least one voice destination designated in the message where a first destination is a telephone capable of communicating only voice and a second destination is simultaneous voice and data (SVD) modem.

3. The method according to claim 2, wherein the control information causes the gateway to compress a voice signal from the telephone to the SVD modem and decompress the voice signal from the SVD modem to the telephone.

* * * * *